US008781514B2

(12) United States Patent
Isberg et al.

(10) Patent No.: US 8,781,514 B2
(45) Date of Patent: Jul. 15, 2014

(54) SYSTEM AND METHOD FOR ESTABLISHING A COMMUNICATION SESSION BETWEEN CONTEXT AWARE PORTABLE COMMUNICATION DEVICES

(75) Inventors: Anders Isberg, Lund (SE); Par-Anders Aronsson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 389 days.

(21) Appl. No.: 13/375,574

(22) PCT Filed: Dec. 16, 2010

(86) PCT No.: PCT/IB2010/003279
§ 371 (c)(1),
(2), (4) Date: Dec. 1, 2011

(87) PCT Pub. No.: WO2012/080765
PCT Pub. Date: Jun. 21, 2012

(65) Prior Publication Data
US 2013/0005383 A1    Jan. 3, 2013

(51) Int. Cl.
*H04W 76/02*    (2009.01)
*H04B 7/00*    (2006.01)

(52) U.S. Cl.
USPC ........ 455/517; 455/456.6; 455/41.2; 455/411

(58) Field of Classification Search
CPC ............................. H04H 60/68; H04W 4/04
USPC .......... 455/517, 518, 519, 67.11, 3.01, 456.1, 455/456.2, 456.3, 69, 414.2, 3.03, 456.6, 455/414.3, 411, 41.2; 370/338, 352
See application file for complete search history.

(56) References Cited

U.S. PATENT DOCUMENTS

| 2005/0172147 | A1* | 8/2005  | Edwards et al. ............... 713/200 |
| 2007/0124503 | A1  | 5/2007  | Ramos et al.                           |
| 2008/0240702 | A1* | 10/2008 | Wassingbo et al. ........... 396/310   |
| 2010/0014497 | A1* | 1/2010  | Aggarwal et al. ............. 370/338  |
| 2010/0056101 | A1  | 3/2010  | Poikselka et al.                       |

FOREIGN PATENT DOCUMENTS

| EP | 1 701 570 | 9/2006  |
| EP | 2077654   | 7/2009  |
| EP | 2237533   | 10/2010 |

* cited by examiner

*Primary Examiner* — John J Lee
(74) *Attorney, Agent, or Firm* — Renner, Otto, Boisselle & Sklar, LLP

(57) ABSTRACT

A system and method for establishing a communication session between at least two parties that are located in a common context (e.g., location) without sufficient knowledge to establish a communication session in a conventional manner. In one embodiment, a request to establish a communication session between two devices is received at a remote server. The request includes user information and location information associated with the first device and the request includes data corresponding to a physical feature of the user of the second device. The request is processed to obtain network information related to the second device, by searching a plurality of user profilers stored on the server based on the received location information and the data corresponding to the physical feature of the associated user of the second portable communication. If a suitable user profile is found, a communication session is established between the devices.

11 Claims, 5 Drawing Sheets

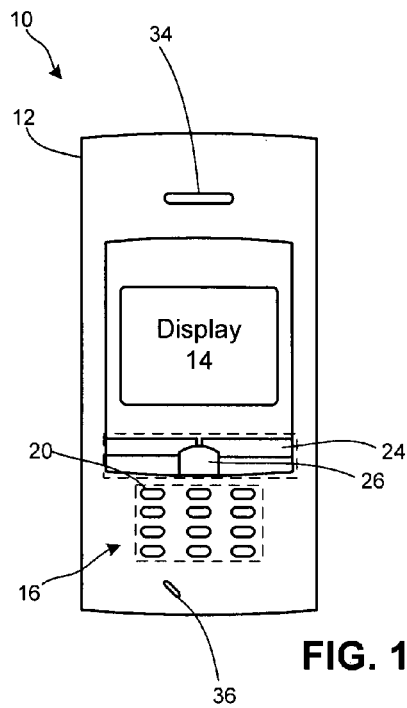
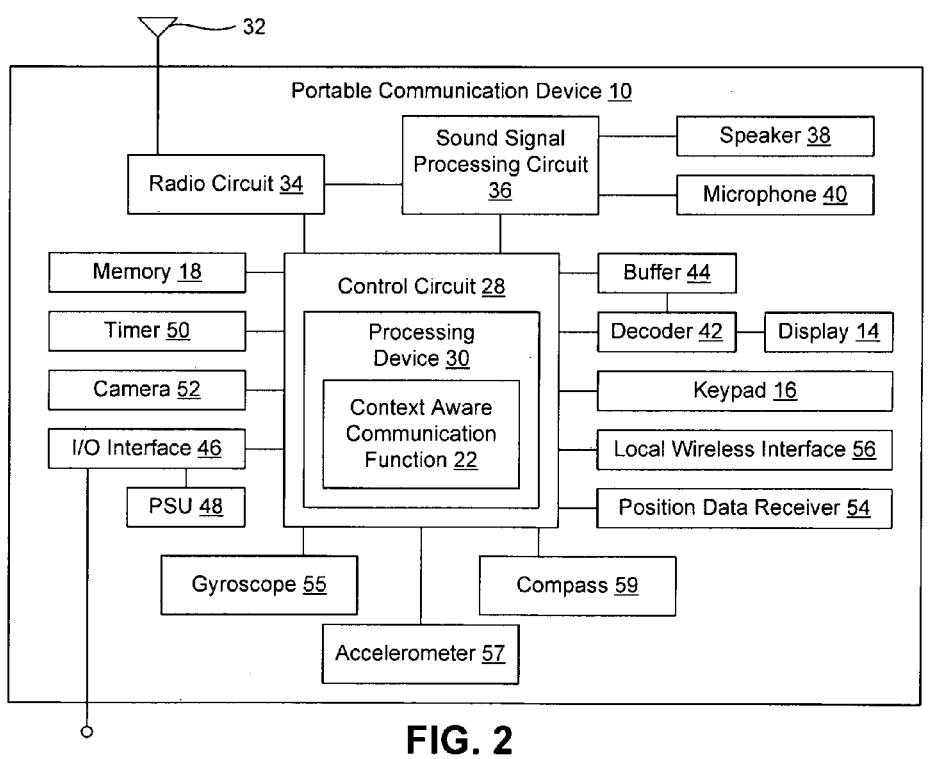
FIG. 1
FIG. 2 ical field of the invention

SYSTEM AND METHOD FOR ESTABLISHING A COMMUNICATION SESSION BETWEEN CONTEXT AWARE PORTABLE COMMUNICATION DEVICES

RELATED APPLICATION DATA

The present application claims the benefit of the filing date of Patent Cooperation Treaty Application Ser. No. PCT/IB10/003,279 filed Dec. 16, 2010, which is incorporated herein by reference in its entirety.

TECHNICAL FIELD OF THE INVENTION

The present invention relates generally to electronic equipment, such as portable communication devices for engaging in voice and data communications. More particularly, the invention relates to a system and method for establishing a wireless communication session between a plurality of portable communication devices.

DESCRIPTION OF THE RELATED ART

Portable communication devices are becoming increasingly popular. For example, digital cameras, mobile telephones and portable media players are now in wide-spread use. In addition, the features associated with certain types of portable communication devices have become increasingly diverse. To name a few examples, many portable electronic devices have cameras, text messaging capability, multimedia messaging capability, Internet browsing functionality, electronic mail capability, video playback capability, audio playback capability, image display capability and hands-free headset interfaces.

It is often desirable for a portable communication device to communicate with other portable communication devices. One problem with such communication is that the user of a portable communication device generally must have prior knowledge or information about the portable communication device to be called prior to establishing a communication session. For example, a party that would like to establish a communication session (e.g., the initiating party) must know the telephone number or address of the target portable communication device prior to attempting to establish a communication session between the devices.

SUMMARY

There is a need in the art for a system and method for establishing a communication session between at least two parties that are located in a common context (e.g., location) without disclosing an identity, telephone number and/or address of the parties involved in the communication session. One aspect of the present invention is to overcome the above problem by establishing a communication session between two or more parties without prior knowledge of the target party's identity, telephone number and/or address of the target party.

One aspect of the invention relates to a method for establishing a communication session between wireless devices, the method includes: receiving a request to establish a communication session between a first portable communication device and a second portable communication device at a remote server, wherein the request includes user information and location information associated with the first portable communication device and the request includes data corresponding to a physical feature of an associated user of the second portable communication device; processing the request at the remote server to obtain network information related to the second portable communication device, wherein the request is processed by searching a plurality of user profilers based on the received location information and the data corresponding to the physical feature of the associated user of the second portable communication; and establishing a communication session between the first portable communication device and the second portable communication device.

Another aspect of the invention relates to storing the plurality of user profiles in one or more memory devices operatively coupled to the remote server.

Another aspect of the invention relates to receiving user profile information from a plurality of portable communication devices, wherein at least some of the plurality of portable communication devices receive wireless network services from different network providers.

Another aspect of the invention relates to at least some of the plurality of user profiles include at least one item selected from the group of: identity information, location information, data corresponding to a physical feature of the user, positioning information and network address information.

Another aspect of the invention relates to the step of processing including processing potential communication candidates based upon the received location information from the first portable communication device.

Another aspect of the invention relates to the received location information including positioning information that corresponds to a direction in which the first portable communication device is directed.

Another aspect of the invention relates to prior to establishing the communication session between the first portable communication device and the second portable communication device, the remote server receives permission from the second portable communication device.

Another aspect of the invention relates to the communication session between the first portable communication device and the second portable communication device is established without receiving permission from the second portable communication device.

Another aspect of the invention relates to the step of processing including utilizing facial recognition to compare data corresponding to the physical feature of the associated user of the second portable communication device with one or more photographs of the user of the second portable communication device stored in the user profile associated with the user of the second portable communication device.

Another aspect of the invention relates to the request being generated by determining a coordinated movement between the first portable communication device and the second portable communication.

One aspect of the invention relates to a portable communication device including: an input device operable to receive an input from an associated user; a location sensor operable to generate location information associated with the portable communication device; an image sensor operable to generate image data; a processor coupled to the input device, the location sensor and the image sensor, wherein when the input device receives a user action, the input device generates an output signal to the processor that causes the processor to: transmit a request to a remote server in order to establish a communication session between the portable communication device and a second portable communication device, wherein the request includes user information and location information associated with the portable communication device and the request further includes, location information generated by the location sensor and the request includes image data corresponding to a physical feature of an associated user of the second portable communication device; and receiving communication session information from the remote server based on the request in order to establish a communication session between the portable communication device and the second portable communication device.

Another aspect of the invention relates to determining a coordinated action between the first portable communication device and the second portable communication based on movement information included in the first request and the second request.

Another aspect of the invention relates to determining if the movement information corresponds to a joint gesture between the first portable communication device and the second portable communication device.

Another aspect of the invention relates to the location information including orientation information associated with a direction in which the first portable communication and/or the second portable communication device is pointed.

Another aspect of the invention relates to the orientation information is generated by at least one of a gyroscope, an accelerometer, compass and/or any other device housed within each of the device operably coupled to at least one of the first portable communication device and/or the second portable communication device.

One aspect of the invention relates to a method for establishing a communication session between wireless devices, the method includes: receiving a first request to establish a communication session from a first portable communication device at a remote server, wherein the first request includes location information associated with the first portable communication device; receiving a second request to establish the communication session from a second portable communication device at the remote server, wherein the second request includes location information associated with the second portable communication device and the first request and the second request are received at the remote server within a predetermined period of time; comparing location information present in the first request and the second request to determine if the first portable communication device and the second portable communication device are proximity of each other; and establishing a communication session between the first portable communication device and the second portable communication device.

Another aspect of the invention relates to determining a coordinated action between the first portable communication device and the second portable communication prior to establishing the communication session.

Another aspect of the invention relates to determining if a joint gesture was made by the first portable communication device and the second portable communication prior to establishing the communication session.

Another aspect of the invention relates to the movement information including positioning information associated with a direction in which the first portable communication and/or the second portable communication device is/are pointed.

Another aspect of the invention relates to the movement information being generated by at least one of a gyroscope, an acceloremeter, or compass operably coupled to at least one of the first portable communication device and/or the second portable communication device.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments. It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 1 is a schematic view of a portable communication in accordance with an embodiment of the present invention.

FIG. 2 is a schematic block diagram of the relevant portion of the portable communication device of FIG. 1 in accordance with an embodiment of the present invention.

DETAILED DESCRIPTION OF EMBODIMENTS

Figure 3:
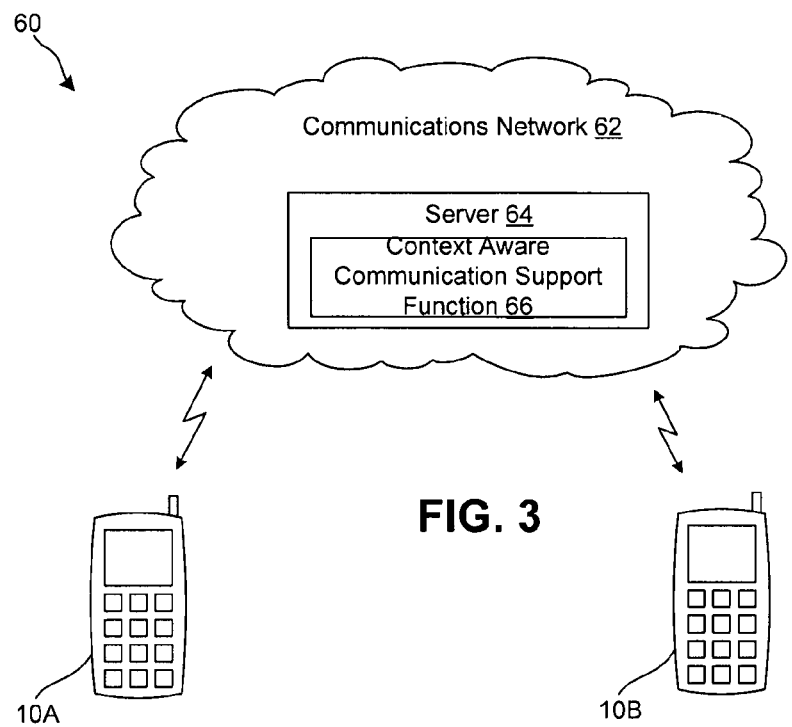
FIG. 3 is a schematic diagram of a communications system in which the portable communication device may operate in accordance with an embodiment of the present invention.

The present invention will now be described with reference to the drawings, wherein like reference numerals are used to refer to like elements throughout. It will be understood that the figures are not necessarily to scale.

The term "electronic equipment" includes portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication devices or the like.

In the present application, the invention is described primarily in the context of a mobile telephone. However, it will be appreciated that the invention is not intended to be limited to a mobile telephone and can be any type of appropriate portable communication device.

Before describing the detailed embodiments that are in accordance with aspect of the present disclosure, it should be observed that the embodiments reside primarily in combinations of method steps and apparatus components related to establishing a communication session between two or more portable communication devices. One of ordinary skill with readily appreciate that the described embodiments are applicable to all wireless communication protocols (e.g., GPRS, GSM, UMTS, 3GPP, CDMA2000, W-CDMA, TDSCDMA, HSPA+, GSM EDGE, WiFi, Bluetooth, etc.). Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The present invention relates to establishing a communication session between two or more portable communication devices, when the initiating party is without knowledge of the identity, telephone number and/or an address of the target party's portable communication device. Aspects of the invention are particularly applicable in situations when people carrying portable communication devices are within a common context (e.g., location). For example, the common context can be identified by all users in the same mobile telecommunication cell, same WiFi cell or within a given radius from the current location of an initiating portable communication device, as measured with a GPS receiver or other location determining device. In general, a request to establish a communication between two or more portable communication devices is transmitted from an initiating party (also referred to herein as a requesting party) to a remote server. The request generally includes location information that corresponds to the current location of the initiating party along with one or more features of the target party (e.g., image data related to the target party). The server coupled to the telecommunications network processes the request to identify the target portable communication device and establish a communication session between the requesting party and the target party.

The phrase "establish a communication session" will be used to broadly mean forming a logical connection for communication between two or more electronic devices. In the mobile telephone environment, a communication session may be established when a first mobile telephone is caused to establish a voice call, transmit an e-mail message (E-mail), transmit a short-message service (SMS), transmit a multimedia message service (MMS), Session Initiation Protocol (SIP) message, TCP/IP signaling, Bluetooth communication, or any other type of message to facilitate communication between another portable communication device or other electronic device. A communication session is normally temporary in duration and is established by one or more portable communication devices requesting services from a network provider. The network provider logically establishes a communication session between the electronic devices by coordinating the actions of the various components of the network and routing communications from one portable communication device to another.

Referring initially to FIG. 1, portable communication device 10 is shown in accordance with aspects of the present invention. The portable communication device 10 includes a context aware communication function 22 (FIG. 3) that is configured to transmit a request to a remote server in order to establish a communication session between another portable communication device. The context aware communication function 22 is particularly useful when a user of the portable communication device 10 would like to establish a communication session with a user of a target device (e.g., another portable communication device) and the target's identity, address and/or telephone number are not known to the initiating user or the portable communication device 10 and the initiating and target devices share a common context (e.g., a location).

For purposes of the present invention, the phrase "common context" may be used in a variety of forms. Typically, common text means that the users have something in common. The common context can relate to geographic terms, defined by boundaries, defined network resources, etc. For example, a common context may be the same mobile cell, same WiFi cell, within a given geographic radius from a current position, within a vehicle (e.g., a train, airplane, ship, arena, stadium, etc.), etc.

The portable communication device 10 is shown as having a "brick" or "block" form factor housing 12, but it will be appreciated that other type housings, such as a clamshell housing or a slide-type housing, may be utilized without departing from the scope of the invention.

The portable communication device 10 includes a display 14 and keypad 16. As is conventional, the display 14 displays information to a user such as operating state, time, telephone numbers, contact information, various navigational menus, etc., which enable the user to utilize the various feature of the portable communication device 10. The display 14 may also be used to visually display content received by the portable communication device 10 and/or retrieved from a memory 18 (FIG. 2) of the portable communication device 10. The display 14 may also be used as a viewfinder to support camera and/or video functions associated with the portable communication device 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys 24 such as a "call send" key for initiating or answering a call, and a "call end" key for ending or "hanging up" a call. Special function keys may also include menu navigation keys 26, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The portable communication device 10 includes conventional call circuitry that enables the portable communication device 10 to establish a call and/or exchange signals with a called/calling device, typically another mobile telephone or landline telephone. However, the called/calling device need not be another telephone, but may be some other device such as an Internet web server, content providing server, etc.

FIG. 2 represents a functional block diagram of the portable communication device 10. With the exception of a context aware communication function 22, which is preferably implemented as executable logic in the form of application software or code within the portable communication device 10, the construction of the portable communication device 10 is otherwise generally conventional. The portable communication device 10 includes a primary control circuit 28 that is configured to carry out overall control of the functions and operations of the portable communication device 10. The control circuit 28 may include a processing device 30, such as a CPU, microcontroller or microprocessor. The processing device 30 executes code stored in a memory (not shown) within the control circuit 28 and/or in a separate memory, such as memory 18, in order to carry out conventional operation of the portable communication device 10. The memory 18 may be, for example, one or more of a buffer, a flash memory, a hard drive, a removable media, a volatile memory, a non-volatile memory or other suitable device. In addition, the processing device 30 executes code in order to perform the context aware communication function 22.

It will be apparent to a person having ordinary skill in the art of computer programming, and specifically in applications programming for mobile telephones or other items of electronic equipment, how to program a portable communication device 10 to operate and carry out the functions described herein. Accordingly, details as to the specific programming code have been left out for sake of brevity. Also, while the context aware communication function 22 is executed by the processing device 30 in accordance with the preferred embodiment of the invention, such functionality could also be carried out via dedicated hardware, firmware, software, or combinations thereof, without departing from the scope of the invention.

Continuing to refer to FIGS. 1 and 2, the portable communication device 10 includes an antenna 32 coupled to a radio circuit 34. The radio circuit 34 includes a radio frequency transmitter and receiver for transmitting and receiving signals via the antenna 32, as is conventional. The radio circuit 34 may be configured to operate in a mobile communications system, as well as to receive audiovisual content. For example, the receiver may be an IP datacast compatible receiver compatible with a hybrid network structure providing mobile communications and DVB-H based or similar services. Other receivers for interaction with a mobile radio network or broadcasting network are possible and include, for example, GSM, CDMA, WCDMA, MBMS, WiFi, WiMax, DVB-H, ISDB-T, etc.

The portable communication device 10 further includes a sound signal processing circuit 36 for processing audio signals transmitted by/received from the radio circuit 34. Coupled to the sound processing circuit 36 are a speaker 38 and a microphone 40 that enables a user to listen and speak via the portable communication device 10, as is conventional. The radio circuit 34 and sound processing circuit 36 are each coupled to the control circuit 28 so as to carry out overall operation.

The portable communication device 10 also includes the aforementioned display 14 and keypad 16 coupled to the control circuit 28. The display 14 may be coupled to the control circuit 28 by a video decoder 42 that converts video data to a video signal used to drive the display 14. The video data may be generated by the control circuit 28, retrieved from a video file that is stored in the memory 18 or derived from an incoming video data stream received by the radio circuit 34. Prior to being feed to the decoder 42, the video data may be buffered in a buffer 44.

The portable communication device 10 further includes one or more I/O interface(s) 46. The I/O interface(s) 46 may be in the form of typical mobile telephone I/O interfaces and may include one or more electrical connectors. As is typical, the I/O interface(s) 46 may be used to couple the portable communication device 10 to a battery charger to charge a battery of a power supply unit (PSU) 48 within the portable communication device 10. In addition, or in the alternative, the I/O interface(s) 46 may serve to connect the portable communication device 10 to a wired personal hands-free adaptor (not shown). Further, the I/O interface(s) 46 may serve to connect the portable communication device 10 to a personal computer or other device via a data cable. The portable communication device 10 may receive operating power via the I/O interface(s) 46 when connected to a vehicle power adapter or an electricity outlet power adapter.

The portable communication device 10 may also include a timer 50 for carrying out timing functions. Such functions may include timing the durations of calls, generating the content of time and date stamps, etc. The portable communication device 10 may include a camera 52 for taking digital pictures and/or movies. Image and/or video files corresponding to the pictures and/or movies may be stored in the memory 18.

The portable communication device 10 also may include a position data receiver 54, such as a global positioning system (GPS) receiver, Galileo satellite system receiver or the like. The portable communication device 10 may also include a gyroscope 55, an accelerometer 57, a compass 59. Such devices may be used to determine a direction the device is pointing, motion, orientation and/or movement that the device is currently experiencing, has experienced in the past, etc.

The portable communication device 10 also may include a local wireless interface 56, such as an infrared transceiver and/or an RF adaptor (e.g., a Bluetooth adapter, WiFi adapter, etc.), for establishing communication with an accessory, hands-free adaptor, another mobile radio terminal, computer or other device.

The portable communication device 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video and so forth. Processing such data may include storing the data in the memory 18, executing applications to allow user interaction with data, displaying video and/or image content associated with the data, broadcasting audio sounds associated with the data and so forth. Processing such data may further include extracting points of interest from the data, video and/or data content for further processing at a remote server, for example.

With additional reference to FIG. 3, an exemplary communications system 60 in accordance with aspects of the present invention is illustrated. The communications system 60 is configured to facilitate communications between portable communication devices 10A, 10B through communications network 62. The communications network 62 includes one or more servers 64 for managing communication services between portable communication devices (e.g., 10A, 10B). Any type of communication session is deemed to fall within the scope of the present invention. Exemplary communication sessions include, for example, short message service (SMS), general packet radio service (GPRS), multimedia message service (MMS), electronic mail (E-mail), packet switching, wireless access protocol (WAP), TCP/IP, SIP, Bluetooth, WiFi and the like.

The communications network 62, through the one or more servers 64, is operable to receive communication requests (e.g., requests to establish a communication session) and establish a logical connection between the requesting portable communication device and the target portable communication device. The one or more servers 64 are operable to communicate with the portable communication devices 10A, 10B via a transmission medium. The transmission medium may be any appropriate device or assembly, including, for example, a communications tower, another portable communication device, a wireless access point, a satellite, etc. Portions of the network may include wireless and/or wired transmission pathways.

The one or more servers 64 are configured to store user profiles in a memory. The user profiles may include any information that corresponds to a characteristic and/or data related to a particular user and/or portable communication device associated with the user. For example, the one or more servers may include a plurality of profiles associated with users of portable communication devices. The profiles may relate to a single network provider or a plurality of network providers. Preferably, the one or more servers are operable over a plurality of network providers, such that user profiles from a plurality of network providers may be stored and/or other compiled in the one or more servers 64.

User profile information may be any information that may be used to distinguish one user from another user. For example, the profile information may include: identification information (e.g., user name, telephone number, address, gender, etc.), network information (network address, telephone number, etc.), image information (e.g., facial features, facial shapes, etc.), location information (e.g., current location, one or more previous locations, etc.), and the like. In one embodiment, the user's current location information along with image information may be used to identify a particular target candidate from a group of potential target candidates.

The network 62 may support the communications activity of multiple portable communication devices 10A, 10B throughout a wide geographic area. In general, a cellular network is a radio network distributed over land areas called "cells". Each cell is served by at least one fixed-location transceiver known as a cell site or base station. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

Figure 4:
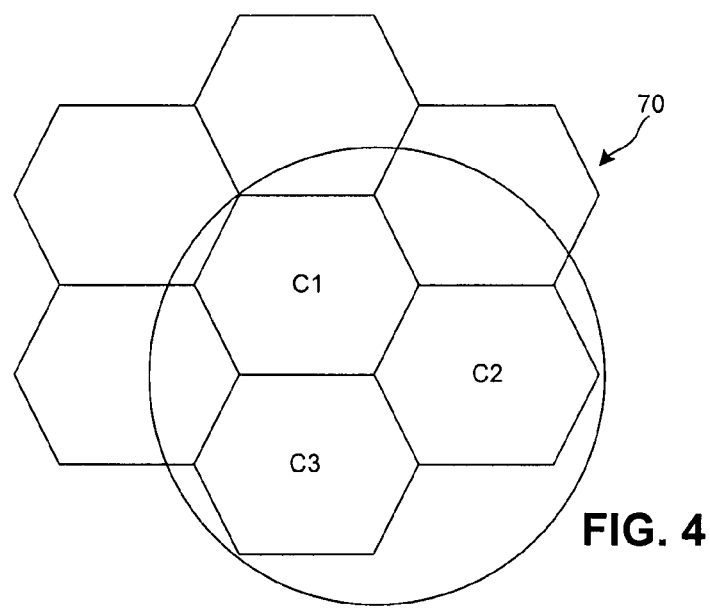
FIG. 4 is an exemplary network topography illustrating an exemplary context in accordance with an embodiment of the present invention.

An exemplary network topography 70 is illustrated in FIG. 4. The network topography 70 includes a plurality of cells (C1-C3) that cover a geographic region in which portable communication services are to be supplied. Each cell (C1-C3) is divided into regular shaped partitions. The partitions may take a hexagonal, square, circular or some other irregular shapes, although hexagonal cells are conventional. Although not shown, one or more of the cells may overlap in order to handoff devices from one cell to another. One aspect of the invention relates to establishing a communication session between parties located in a common context, as set forth above. When both parties are being provided network communication services by a transceiver within the same cell (e.g., C1, C2 or C3), the parties share a common context (e.g., the cell in which both parties are located).

As stated above, the one or more servers 64 are configured to establish a logical connection between a requesting portable communication device (e.g., 10A) and a target portable communication device (e.g., 10B). In one embodiment, the one or more servers 64 may operate in a standalone configuration relative to other servers of the network 62 or may be configured to carry out multiple communications network functions. As will be discussed below, the server 64 may be configured as a typical computer system used carry out server functions and may include a processor configured to execute software containing logical instructions that embody the functions of the server 64. Those functions may include functions that are complimentary to the operation of a context communication function 22 of the portable communication device 10A, 10B, and will be collectively referred to as a context communication support function 66.

As described in detail below, the context communication support function 66 is operable to process requests received at the remote server 64 and resolve context, physical and any other received information in order to identify a target for the communication request and establish a communication between the requesting portable communication device and the target portable communication device.

Figure 5:
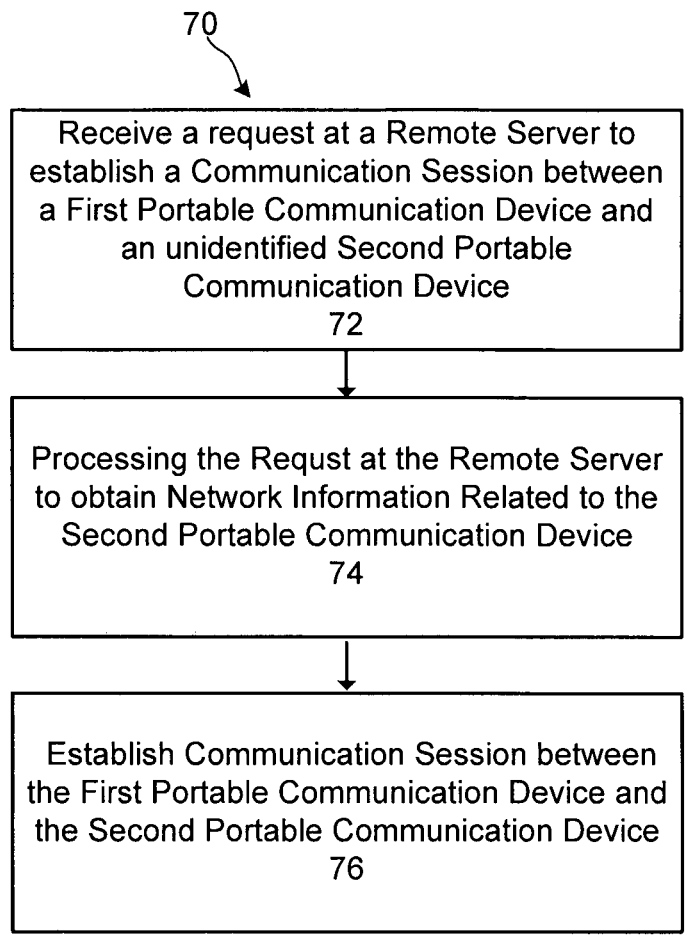
FIGS. 5-7 are flow charts of exemplary methods in accordance with embodiments of the present invention.

Referring to FIG. 5, a method 70 for establishing a communication session between wireless devices (e.g., portable communication devices 10A, 10B) is illustrated. The method 70 is operable as the context aware communication support function 66 that is resident on the one or more severs 64. The context aware support function 66 works together with the context aware communication function 22 to establish a communication session as set forth below.

The method 70 assumes that communications network 62 includes one more servers 64 that are operable to track users' current locations along with profile information associated with the users, as set forth above. The one or more servers 64 may track users of a single network provider or a plurality of network providers. In one embodiment, method 70 is operable by a third party that is independent of the user and/or network provider.

It is assumed that the first portable communication device 10A and/or the user of the first portable communication device 10A does not have sufficient knowledge to establish a communication session with the second portable communication device 10B by the user of the first portable communication device simply entering the telephone number and/or e-mail address of the user of the second portable communication to establish a communication session.

At block 72, the remote server 64 receives a request to establish a communication session between a first portable communication device (e.g., 10A) and a second portable communication device (e.g., 10B). The request may include a variety of information to establish a common parameter to enable communication with the second portable communication device 10B. Such information may include, for example, user information, location information, profile information, network information, address information, and any other pertinent information associated with either the requesting and/or target portable communication device. For example, if portable communication device 10A transmitted the request to the server 64, the request may include user information, profile information, network information and/or address information associated with the user of the portable communication device 10A. The request may also include the current geographic location of the portable communication device 10A, for example.

The request transmitted to the server 64 also may include data corresponding to at least one characteristic and/or property associated with the target user and/or target portable communication device. For example, the at least one characteristic may be a physical feature associated with the user of the target portable communication device. In such a case, the physical feature may be in the form of an image and/or image information corresponding to the target that the requesting party seeks to establish a communication session. Therefore, the request may contain an image and/or data related to the image. The request may also include location information associated with the target user and/or target device.

At block 74, the request is processed at the remote server to obtain network information related to the second portable communication device. In one embodiment, the request is processed by searching a plurality of user profiles based on the received location information and the data corresponding to the physical feature of the associated user of the second portable communication. For example, one aspect of the present invention assumes that the requesting party and the target party share a common context (e.g., location).

The common context may take any shape or form. For example, a common context may be identified by taking all users in the same network cell (e.g., two users in cell C1 (from FIG. 4), the same WiFi cell, or within a given radius from the current location, as measured with a GPS receiver, for example. Note the above common contexts are exemplary in nature and not intended to limit the scope of the present invention. Other contexts may include, for example, a vehicle (e.g., a bus, train, airplane, ship, etc), a hotel, a stadium, an arena, a night club, bar, etc.

In general, the context alone may not be sufficient to uniquely identify the target party to establish a communication session. If two users are in proximity, a user A could direct their portable communication device (e.g., portable communication device 10A) camera towards user B (e.g., user of portable communication device 10B) as an indication that user A would like to establish a communication session with user B. When user A selects user B in the camera view finder (e.g., display 14), a photograph and/or image data related to user B is transmitted to the server 64, along with location information (as set forth above). The server 64, running the context aware communication support function 66 may resolve the address to user B by selecting all users with the same context (e.g., location). If no other users are in the common context, the location information may be sufficient to establish a communication session between the requesting portable communication device and the target portable communication device.

Assuming that the location information is not sufficient to resolve a unique target party, the server 64 may then process the one or more physical characteristics received in the request to determine the appropriate target. The above statement assumes that all persons within that context are in the database. If this is not the case, for example, there is an individual not registered in the database then the one or more physical characteristics are processed to ensure that the desired target party is found. Thus, processing the one or more physical characteristics provides a safeguard to ensure communications with the proper target party.

In another embodiment, the request may also include device orientation information associated with the requesting portable communication device. For example, in addition to the location information, the orientation information may provide additional information as to the direction the requesting portable communication device was pointing when the request was generated. The orientation information may be generated by a gyroscope, an accelerometer, compass and/or any other device housed within each of the devices to determine the respective movement. If the orientation information is sufficiently accurate, the final selection may be made without further processing the physical characteristic information. Otherwise, the orientation information may be used to reduce the number of user profiles that are required to be searched. For example, if the requesting portable communication device is located in the center of C1 (FIG. 4) and is facing in a northward direction, the search executed by the context aware communication support function 66 may eliminate users that are located south of the requesting portable communication device.

If the location information and optionally the orientation information are not sufficiently accurate, the physical characteristic information may also be processed by comparing the received information in the request with the user profiles stored on the server 64. A target candidate may then be selected by comparing the photograph and/or image data received in the request with the user profiles stored on the server 64. As stated above, it is preferable to process the physical characteristic information to ensure communications with the proper target party.

At block 76, if a match is found between the image data received in the request and the user profiles, a communication session is established between the requesting portable communication device (e.g., 10A) and the target portable communication device (e.g., 10B) through the communications network 62. Thus, method 70 allows a communication session to be established between users of portable communication devices that have insufficient information about each other to establish a communication in a conventional manner.

One aspect of the invention allows the profile information to be shared according user preferences. For example, certain users may not wish to provide their address (e.g., telephone number) and/or other identification information (name, address, etc.) to others. As such, the user may customize the information that is accessible and communication sessions established pursuant to method 70 will include such preferences. For example, if user B desires to keep all information private, a communication may be established between the portable communication devices, but private information related user B will not be made available to user A, for example.

Figure 6:
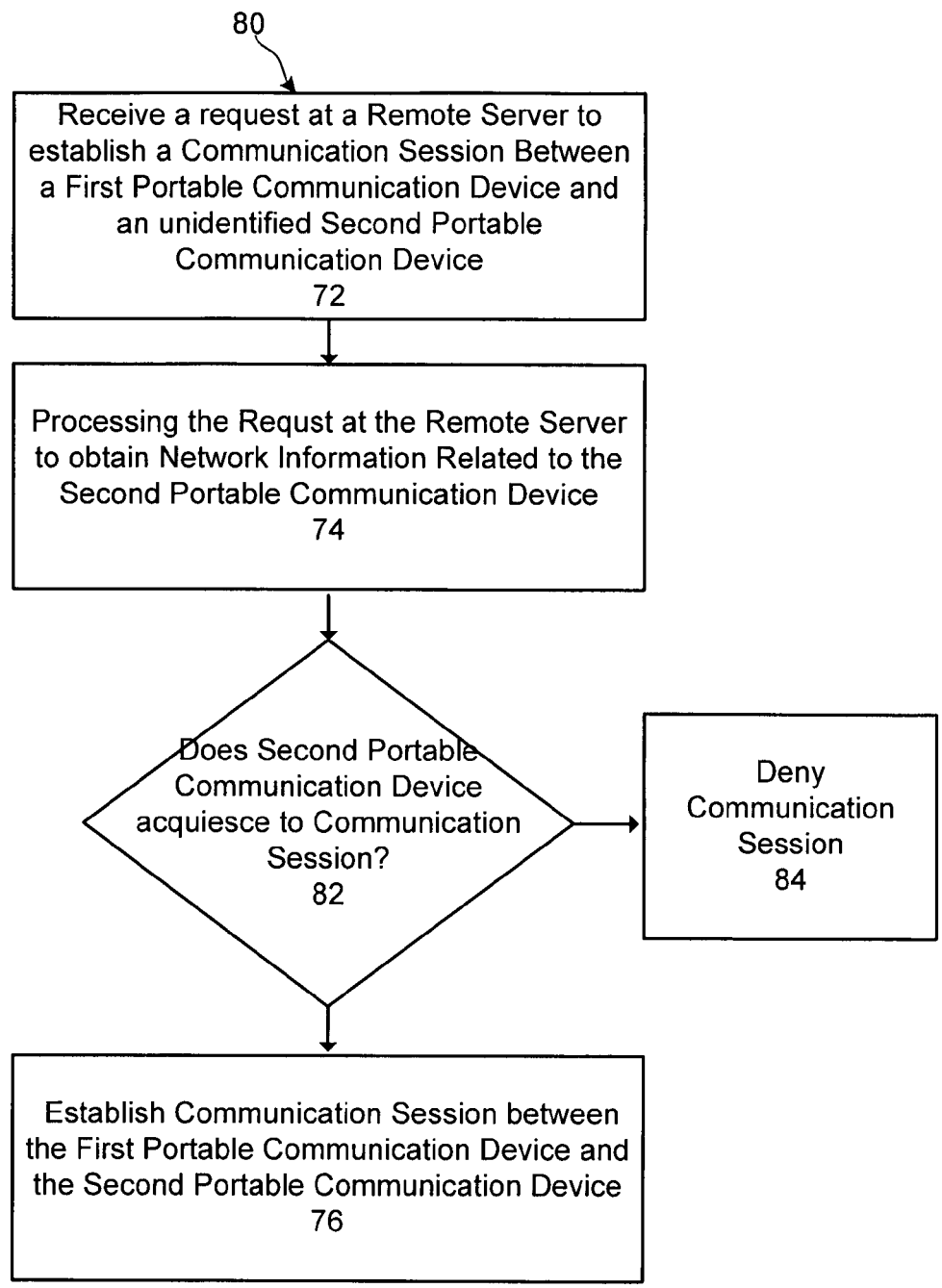

Another embodiment of the present invention is illustrated in FIG. 6. The method 80 is substantially the same as method 70, except that at block 82, the user of the target portable communication (e.g., portable communication device 10B) must acquiesce to the communication session prior to establishing the communication session. In this embodiment, a communication session is not established until both user A and user B have agreed to the communication session, as illustrated at block 82. It will be assumed that since user A has transmitted the request for the communication session that user A has implicitly agreed to the communication session, but consent (e.g., an affirmative act) is needed from user B before the communication session is established, according to method 80. For example, a communication session initiated by user A may be established if user B also selects user A and sends a request to the server 64 or user B engages in a predetermined act that establishes consent to join a communication session with the requesting user (e.g., user A). A person of ordinary skill in the art will readily appreciate that consent in the mobile communications environment may be provided in a number of ways. For example, the display on user B's portable communication device may ask if user B desires to establish a communication session. User B may then transmit an appropriate response (e.g., to grant permission or deny permission) back to the server 64. Requiring both parties to consent to the communication session ensures that only welcomed sessions are established. If User B does not agree to the communication session, the communication request from User A (e.g., portable communication device 10A) is denied, as shown in block 84.

Figure 7:
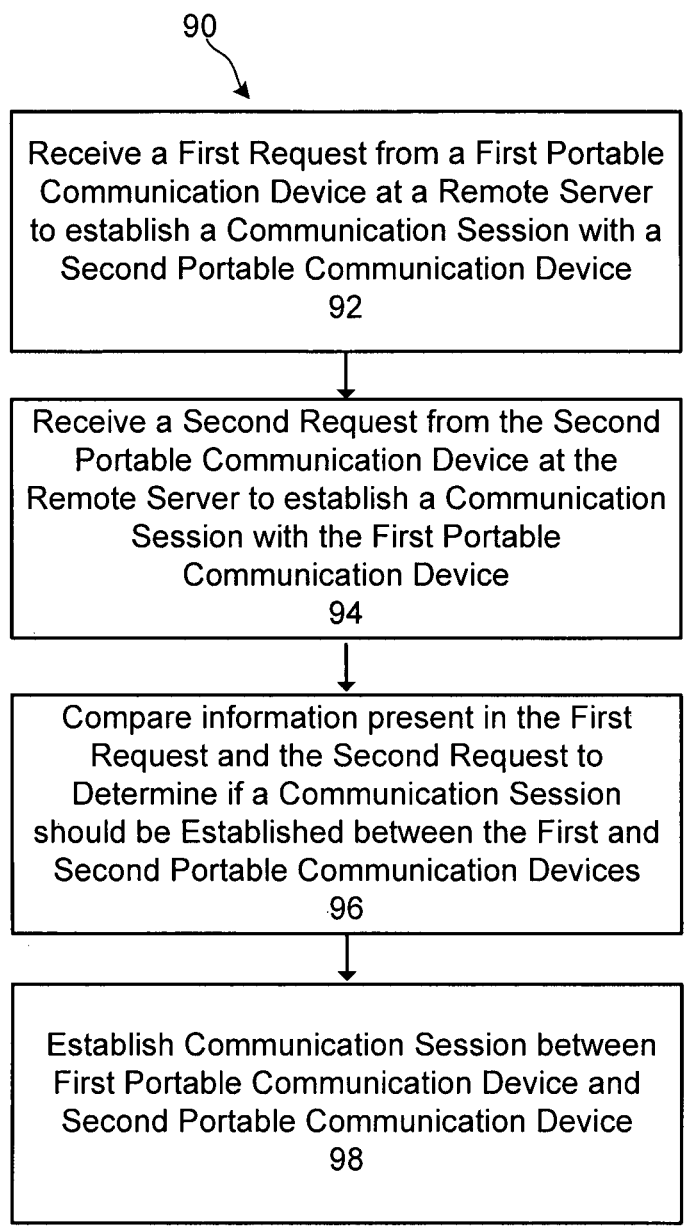

Another exemplary method 90 for establishing a communication session between wireless devices is illustrated in FIG. 7. At block 92, a first request to establish a communication session from a first portable communication device is received at a remote server 64. The first request generally includes location information associated with the first portable communication device and may include address information and or/any other desired information (e.g., location information, orientation information, movement information, etc).

At block 94, a second request to establish the communication session is received from a second portable communication device at the remote server 64. Like the first request, the second request generally includes location information associated with the second portable communication device and may include address information and/or any other desired information.

The first request and the second request are received at the remote server 64 within a predetermined period of time. An exemplary period of time may be less than 5 seconds; and preferably is less than 1 second.

The requests may be generated by each user manually or by any another suitable means. For example, the first user and the second user make eye contact with each other and direct their portable communication devices at each other and then utilize a user input device to generate the request (e.g., take a photograph, enter a key, etc.).

The first and second requests may also include additional information. For example, the requests may further include motion information (e.g., data that corresponds to movement of the portable communication device). This motion data may be used by the context aware communication support function 66 to determine if the requesting portable communication device and the target portable communication device are acting in concert. For example, the users of the portable communication devices may make complimentary gestures (e.g., pass and catch movement, up and down movement, waving movement, etc.). The movement information may be generated by a gyroscope, an accelerometer, compass and/or any other device housed within each of the devices to determine the respective movement.

At block 96, the server 64 compares the information present in the first request and the second request to determine if the first portable communication device and the second portable communication device are in proximity of each other and whether the devices acting in concert (e.g., coordinated action, joint gesture, etc.).

If the server 64 determines that the requests are from portable devices within a common context, the requests are received within a predetermined time, and the requests include movement information that shows the devices are acting in concert, at block 98, a communication session is established between the first portable communication device and the second portable communication device.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A method for establishing a communication session between wireless devices, the method comprising:
   receiving a request to establish a communication session between a first portable communication device and a second portable communication device at a remote server, wherein the request includes user information and location information associated with the first portable communication device and the request includes data corresponding a physical feature of an associated user of the second portable communication device;
   processing the request at the remote server to obtain network information related to the second portable communication device, wherein the request is processed by searching a plurality of user profiles based on the received location information and the data corresponding to the physical feature of the associated user of the second portable communication device; and
   establishing a communication session between the first portable communication device and the second portable communication device; and
   wherein the step of processing includes utilizing facial recognition to compare the data corresponding to the physical feature of the associated user of the second portable communication device with one or more photographs of the user of the second portable communication device stored in the user profile associated with the user of the second portable communication device.

2. The method of claim 1, further including storing the plurality of user profiles in one or more memory devices operatively coupled to the remote server.

3. The method of claim 1, further including receiving user profile information from a plurality of portable communication devices (10A, 10B), wherein at least some of the plurality of portable communication devices receive wireless network services from different network providers.

4. The method of claim 1, wherein at least some of the plurality of user profiles include at least one item selected from the group of: identity information, location information, data corresponding to a physical feature of the user, positioning information and network address information.

5. The method of claim 1, wherein the step of processing includes processing potential communication candidates based upon the received location information from the first portable communication device.

6. The method of claim 5, wherein the received location information includes positioning information that corresponds to a direction in which the first portable communication device is directed.

7. The method of claim 1, wherein prior to establishing the communication session between the first portable communication device and the second portable communication device, the remote server receives permission from the second portable communication device.

8. The method of claim 1, wherein the communication session between the first portable communication device and the second portable communication device is established without receiving permission from the second portable communication device.

9. The method of claim 1, wherein the request is generated by determining a coordinated movement between the first portable communication device and the second portable communication.

10. The method of claim 1, wherein the data corresponding to the physical feature of the associated user of the second portable communication device is in the form of an image.

11. The method of claim 1, wherein the processing based on the received location information includes determining that the first portable communication device and the second portable communication device are within the same mobile telecommunications cell, the same WiFi cell or a predetermined radius.

* * * * *